United States Patent
Masini et al.

(10) Patent No.: US 10,506,651 B2
(45) Date of Patent: Dec. 10, 2019

(54) MOBILITY SIGNALLING FOR USER EQUIPMENT USING DUAL CONNECTIVITY

(71) Applicant: Telefonaktiebolaget LM Ericsson (publ), Stockholm (SE)

(72) Inventors: Gino Masini, Stockholm (SE); Angelo Centonza, Stockholm (SE); Mojgan Fadaki, Solna (SE); Alexander Vesely, Feldbach (AT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 195 days.

(21) Appl. No.: 15/543,682

(22) PCT Filed: Jan. 28, 2016

(86) PCT No.: PCT/SE2016/050057
§ 371 (c)(1),
(2) Date: Jul. 14, 2017

(87) PCT Pub. No.: WO2016/122388
PCT Pub. Date: Aug. 4, 2016

(65) Prior Publication Data
US 2017/0374545 A1    Dec. 28, 2017

Related U.S. Application Data

(60) Provisional application No. 62/109,838, filed on Jan. 30, 2015.

(51) Int. Cl.
*H04W 8/18* (2009.01)
*H04W 76/15* (2018.01)
(Continued)

(52) U.S. Cl.
CPC ............. *H04W 76/15* (2018.02); *H04W 8/08* (2013.01); *H04W 8/186* (2013.01); *H04W 16/32* (2013.01);
(Continued)

(58) Field of Classification Search
CPC ....... H04W 8/186; H04W 8/08; H04W 72/04; H04W 72/0446; H04W 72/0452; H04W 72/042; H04L 5/0053
See application file for complete search history.

(56) References Cited

U.S. PATENT DOCUMENTS

| | | | |
|---|---|---|---|
| 2012/0108244 A1* | 5/2012 | Shi | H04W 36/0022 455/438 |
| 2014/0010203 A1* | 1/2014 | Zhang | H04W 48/02 370/331 |

FOREIGN PATENT DOCUMENTS

| WO | WO 2013009147 A2 | 1/2013 |
|---|---|---|
| WO | WO 2016006936 A1 | 1/2016 |

OTHER PUBLICATIONS

International Search Report of the International Searching Authority for International Application No. PCT/SE2016/050057 (dated Jan. 28, 2016).

(Continued)

*Primary Examiner* — Jamal Javaid
(74) *Attorney, Agent, or Firm* — Sage Patent Group

(57) ABSTRACT

A method according to some embodiments includes receiving identification of a cell in a Secondary eNodeB (SeNB cell) that is proposed to be added to a Secondary Cell Group of a user equipment node, a Closed Subscriber Group (CSG) ID associated with the SeNB cell and a CSG Membership status of the user equipment node relative to the CSG ID; determining if the SeNB cell is operating in a closed or hybrid access mode; adding the SeNB cell to the Secondary Cell Group of the user equipment node in response to
(Continued)

determining that the SeNB is operating in the hybrid access mode; and thereafter, verifying the CSG Membership status of the user equipment node relative to the CSG ID.

14 Claims, 8 Drawing Sheets

(51) Int. Cl.
　　*H04W 48/16*　　(2009.01)
　　*H04W 8/08*　　(2009.01)
　　*H04W 16/32*　　(2009.01)
　　*H04W 92/20*　　(2009.01)
　　*H04W 76/27*　　(2018.01)
　　*H04W 72/04*　　(2009.01)
　　*H04W 88/06*　　(2009.01)
　　*H04W 36/00*　　(2009.01)

(52) U.S. Cl.
　　CPC ........ *H04W 48/16* (2013.01); *H04W 36/0069* (2018.08); *H04W 72/04* (2013.01); *H04W 76/27* (2018.02); *H04W 88/06* (2013.01); *H04W 92/20* (2013.01)

(56) References Cited

OTHER PUBLICATIONS

TSG RAN Meeting #65; Edinburgh, Scotland; Sep. 9-12, 2014; RP-141472; ZTE; New WID on Dual Connectivity enhancements in L TE; Publication date Sep. 6, 2014; whole document; Chapters 3 and 4.1.

TSG RAN Meeting #65; Edinburgh, Scotland; Sep. 9-12, 2014; RP-141333; Samsung, China Telecom; Motivation for new WI Proposal on Dual Connectivity enhancements for LTE; Publication date Sep. 2, 2014; whole document; Chapter "HeNB" on p. 2.

3GPP TR 36.842 V12.0.0 (Dec. 2013); 3rd Generation Partnership Project; Technical Specification Group Radio Access Network; Study on Small Cell enhancements for EUTRA and E-UTRAN; Higher layer aspects (Release 12); Publication date Dec. 29, 2013; Chapter 3.1, chapter 8.1.4.1, and Annex G.

3GPP TS 22.220 V12.0.0 (Jan. 2014 O); 3rd Generation Partnership Project; Technical Specification Group Services and System Aspects; Service requirements for Home Node B (HNB) and Home eNodeB (HeNB)(Release 12); Publication date Oct. 3, 2014; Chapter 3.1 and chapter 5.3.

3GPP TR 36.875 V13.1.0 (Sep. 2015); 3rd Generation Partnership Project; Technical Specification Group Radio Access Network; Evolved Universal Terrestrial Radio Access Network (E-UTRAN); Extension of dual connectivity in EUTRAN (Release 13); Publication date Sep. 22, 2015; pp. 29-35; Chapter 4.5.1.

\* cited by examiner

MOBILITY SIGNALLING FOR USER EQUIPMENT USING DUAL CONNECTIVITY

RELATED APPLICATIONS

The present application claims the benefit of and priority to U.S. Provisional Patent Application No. 62/109,838, filed Jan. 30, 2015, entitled "Mobility Signalling For User Equipment Using Dual Connectivity," the disclosure of which is hereby incorporated herein by reference in its entirety. This application is a 35 U.S.C. § 371 national stage application of PCT International Application No. PCT/SE2015/050057, filed on Jan. 28, 2016, the disclosure and content of which is incorporated by reference herein in its entirety.

FIELD

The present disclosure relates to mobile communications, and more particularly, to the use of dual connectivity in mobile communications systems.

BACKGROUND

The capacity and performance of mobile networks may be increased through the use of heterogeneous networks in which the traditional high power macro base stations that provide wireless access over a geographic area are complemented with one or more low-powered base stations that may be deployed within the geographic area in locations where there is high demand for bandwidth. The layer of communications provided by the traditional base stations is referred to as the macro layer, and the traditional base stations are sometimes referred to as macro base stations. The low power base stations are sometimes referred to as pico or femto base stations, and generally serve a smaller geographic area (i.e., a picocell or femtocell) within a macro cell served by a macro base station.

The 3rd Generation Partnership Project (3GPP) has incorporated the concept of heterogeneous networks as one of the core items of study in the latest enhancements of the LTE standard, such as LTE Release 11 (or LTE Rel-11). Several low-powered base stations have been defined by the 3GPP for realizing heterogeneous networks such as pico base stations, femto base stations (also known as home eNodeBs, home eNBs, home base stations or HeNBs), relays, and RRHs (remote radio heads).

Dual Connectivity (DC) was introduced in LTE Release 12 for inter-frequency heterogeneous deployments, i.e. where macro and pico base stations operate on separate frequencies. The eNodeB (or eNB) base stations involved in Dual Connectivity are called the Master eNB (MeNB) and the Secondary eNB (SeNB). In Dual Connectivity, a user equipment node (UE) communicates simultaneously with both the Master eNB and the Secondary eNB. This allows the system to increase the total bandwidth of communications to/from the UE.

Cell resources provided by the Master eNB are referred to as the Master Cell Group (MCG), while cell resources provided by the Secondary eNB are referred to as the Secondary Cell Group (SCG). Both Cell Groups may consist of several cells. Signaling protocols defined by the 3GPP enable a total of 5 cells to be included in a Master Cell Group and in a Secondary Cell Group.

The 3GPP also defines the so-called Closed Subscriber Group (CSG) concept. A Closed Subscriber Group is made of a number of UEs that have privileged access to those cells that transmit a CSG Identifier (CSG ID) that identifies the group. A cell that supports the Closed Subscriber Group functionality can be categorized as one of a closed access type or a hybrid access type. Closed access cells are cells in which only UEs that are member of the Closed Subscriber Group corresponding to the CSG ID transmitted by the cell can enter. Hybrid access cells are cells in which those UEs that are members of the Closed Subscriber Group associated with the CSG ID transmitted by the cell may be prioritized with respect to other UEs. That is, for a hybrid access cell, Closed Subscriber Group member UEs of may enjoy better quality of service (QoS) than other UEs attempting to access the same cell.

The membership status to a given Closed Subscriber Group for a given UE determines whether the UE is member or non-member of the Closed Subscriber Group, and therefore determines whether the UE can access a closed access CSG cell or whether the UE can be prioritized in a hybrid access CSG cell.

Closed Subscriber Groups can be supported by Home eNBs as well as by any other base station in the system.

In LTE Release 13, some of the ongoing work items aims to add requirements, and, if needed, respective solutions for the support of Closed Subscriber Groups for dual connectivity.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

A method according to some embodiments includes receiving, at a network node, a Closed Subscriber Group, CSG, ID associated with a Secondary eNodeB, SeNB, cell that is proposed to be added to a Secondary Cell Group of a user equipment node and a CSG Membership status of the user equipment node relative to the CSG ID, determining if the SeNB cell is operating in a closed or hybrid access mode, adding the SeNB cell to the Secondary Cell Group of the user equipment node in response to determining that the SeNB is operating in the hybrid access mode, and thereafter, verifying the CSG Membership status of the user equipment node relative to the CSG ID.

The method may further include, if verification of the CSG Membership status of the user equipment node relative to the CSG ID reveals an actual CSG Membership Status different from the one previously received, informing the SeNB of the actual CSG Membership status of the user equipment node.

The method may further include initiating an X2AP SeNB modification procedure in response to failure of verification of the CSG Membership status of the user equipment node relative to the CSG ID.

The method may further include sending an SeNB addition request to the SeNB in response to determining that the SeNB cell is operating in hybrid access mode.

The SeNB addition request may include a CSG Membership Status Information Element.

The method may further include verifying the CGS Membership status of the user equipment node relative to the CSG ID in response to determining that the SeNB cell is operating in the closed access mode.

The method may further include performing RRC reconfiguration to enable dual connectivity between the user equipment node and the SeNB before verifying the CSG Membership status of the user equipment node.

Verifying the CSG Membership status of the user equipment node may include sending a request to a mobility management entity over an S1AP protocol interface.

The CSG ID and the CSG Membership status of the user equipment node relative to the CSG ID may be received in a measurement report.

The method may further include receiving a context modification request from a mobility management entity indicating a change in CSG Membership status of the user equipment node, and notifying the SeNB of the change in CSG Membership status of the user equipment node.

The steps of (i) receiving the identification of the cell in a SeNB cell that is proposed to be added to a Secondary Cell Group of a user equipment node, the CSG ID associated with the SeNB cell and the CSG Membership status of the user equipment node relative to the CSG ID, (ii) determining if the SeNB cell is operating in a closed or hybrid access mode, (iii) adding the SeNB cell to the Secondary Cell Group of the user equipment node in response to determining that the SeNB is operating in the hybrid access mode, and (iv) verifying the CSG Membership status of the user equipment node relative to the CSG ID may be performed by a processing circuitry.

A network node according to some embodiments includes a processor circuit, a network interface coupled to the processor, and a memory device coupled to the processor.

The memory device includes a UE management module that configures the processor circuit to receive identification of a cell in a Secondary eNodeB, SeNB cell, that is proposed to be added to a Secondary Cell Group of a user equipment node, a Closed Subscriber Group, CSG, ID associated with the SeNB cell and a CSG Membership status of the user equipment node relative to the CSG ID, determine if the SeNB cell is operating in a closed or hybrid access mode, add the SeNB cell to the Secondary Cell Group of the user equipment node in response to determining that the SeNB is operating in the hybrid access mode, and thereafter, verify the CSG Membership status of the user equipment node relative to the CSG ID.

The UE management module may further configure the processor circuit to perform operations as described above.

A network node according to some embodiments is adapted to receive identification of a cell in a Secondary eNodeB, SeNB cell, that is proposed to be added to a Secondary Cell Group of a user equipment node, a Closed Subscriber Group, CSG, ID associated with the SeNB cell and a CSG Membership status of the user equipment node relative to the CSG ID, determine if the SeNB cell is operating in a closed or hybrid access mode, add the SeNB cell to the Secondary Cell Group of the user equipment node in response to determining that the SeNB is operating in the hybrid access mode, and thereafter, verify the CSG Membership status of the user equipment node relative to the CSG ID.

A method according to some embodiments includes receiving an SeNB addition request, the SeNB request identifying a user equipment, UE, and a Closed Subscriber Group ID, CSG ID, associated with the UE, adding a cell corresponding to the CSG ID to a Secondary Cell Group of the UE, receiving an SeNB modification request indicating a change to a CSG Membership status of the UE, and updating the UE context in response to the SeNB modification request.

A network node according to some embodiments includes a processor circuit, a network interface coupled to the processor, and a memory device coupled to the processor. The memory device includes a UE management module that configures the processor circuit to receive an SeNB addition request, the SeNB addition request identifying a user equipment, UE, and a Closed Subscriber Group ID, CSG ID, associated with the UE, add a cell corresponding to the CSG ID to a Secondary Cell Group of the UE, receive an SeNB modification request indicating a change to a CSG Membership status of the UE, and update the UE context in response to the SeNB modification request.

A network node according to some embodiments is adapted to receive an SeNB addition request, the SeNB request identifying a user equipment, UE, and a Closed Subscriber Group ID, CSG ID, associated with the UE, add a cell corresponding to the CSG ID to a Secondary Cell Group of the UE, receive an SeNB modification request indicating a change to a CSG Membership status of the UE, and update the UE context in response to the SeNB modification request.

A method of operating a user equipment node according to some embodiments includes detecting a candidate cell for dual connectivity, the candidate cell having Closed Subscriber Group, CSG, functionality, determining a CSG ID of the candidate cell, determining a CSG membership status of the UE based on the CSG ID, and transmitting the CSG ID and CSG Membership status to a Master eNodeB.

A user equipment node according to some embodiments includes a processor circuit, a network interface coupled to the processor, and a memory device coupled to the processor. The memory device includes a functional module that configures the processor circuit to detect a candidate cell for dual connectivity, the candidate cell having Closed Subscriber Group, CSG, functionality, determine a CSG ID of the candidate cell, determine a CSG membership status of the UE based on the CSG ID, and transmit the CSG ID and CSG Membership status to a Master eNodeB.

A user equipment node according to some embodiments is adapted to detect a candidate cell for dual connectivity, the candidate cell having Closed Subscriber Group, CSG, functionality, determine a CSG ID of the candidate cell, determine a CSG membership status of the UE based on the CSG ID, and transmit the CSG ID and CSG Membership status to a Master eNodeB.

An advantage with the above-described embodiments is that they provide a mechanism to verify the CSG membership status of a UE when the Secondary eNB (SeNB) selected for use in Dual Connectivity support to the UE is a (H)eNB in Closed or Hybrid access mode. In particular embodiments, CSG membership status of a UE may be verified by the MME function in an LTE network. Verification of the CSG membership status of the UE is transmitted to the Master eNB when the Secondary eNB supports Closed Subscriber Groups in Dual Connectivity. Some embodiments provide systems/methods for verifying the CSG Membership Status of a UE using Dual Connectivity when a cell to be added to a Secondary Cell Group is a CSG cell. These systems/methods may also help ensure that Dual Connectivity is working for CSG.

Further advantages and features of embodiments of the present disclosure will become apparent when reading the following detailed description in conjunction with the drawings.

DETAILED DESCRIPTION OF EMBODIMENTS

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Note that although terminology from LTE is generally used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), 1MB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station also referred to as NodeB, eNB, eNodeB, or Evolved Node B) and wireless terminal or mobile terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

Figure 1:
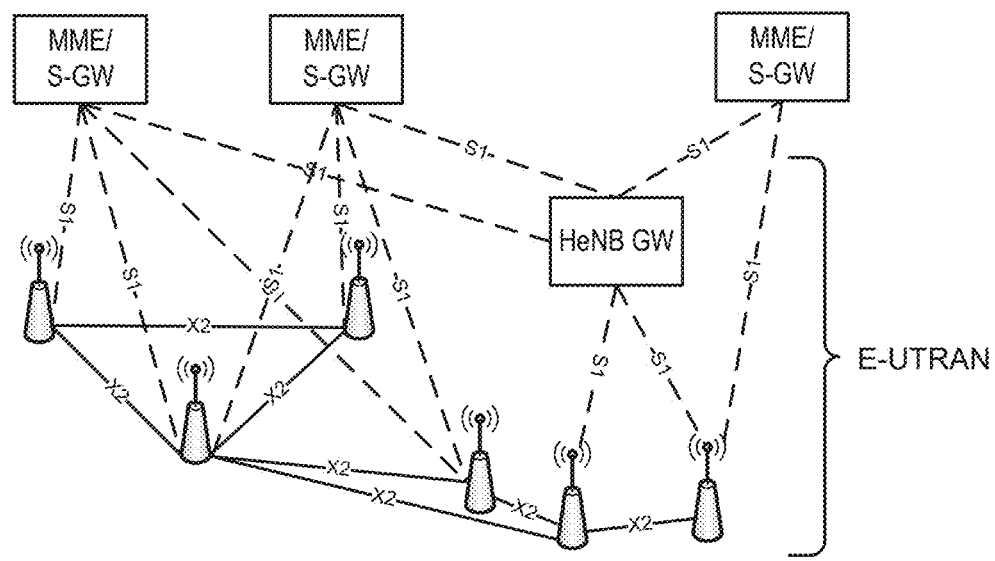
FIG. 1 is a schematic block diagram of an LTE network.

An architecture of an LTE system in which embodiments of the present inventive concepts may be implemented is shown in FIG. 1. The architecture includes radio access nodes (eNBs, Home eNBs, or HeNBs), a HeNB Gateway (HeNB GW), and evolved packet core nodes (MME/S-GW). As it can be seen in FIG. 1, an S1 protocol interface connects HeNBs/eNBs to the MME/S-GW and HeNBs to the HeNB GW, while an X2 protocol interface connects peer eNBs/HeNBs.

Figure 2:
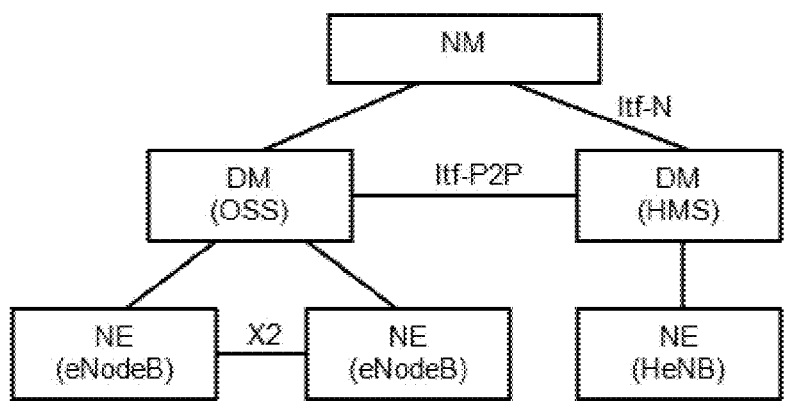
FIG. 2. is a schematic block diagram of a management system of an LTE network that can coordinate operations according to embodiments of the inventive concepts.

FIG. 2 illustrates a management system of an LTE network that can coordinate operations according to embodiments of the inventive concepts. The management system includes node elements (NE), also referred to as eNodeBs, that are managed by a Domain Manager (DM), also referred to as the operation and support system (OSS). The Domain Manager may further be managed by a Network Manager (NM). Two Node Elements communicate using the X2 protocol, while the interface between two Domain Managers is referred to as Itf-P2P. The management system may configure the network elements, as well as receive observations associated to features in the network elements. For example, the Domain Manager observes and configures Node Elements, while the Network Manager observes and configures the Domain Manager, as well as Network Elements via the Domain Manager.

By means of configuration via the Domain Manager, the Network Manager and related interfaces, functions over the X2 and S1 interfaces can be carried out in a coordinated manner throughout the radio access network, eventually involving the Core Network, i.e. MME and S-GWs.

Figure 3:
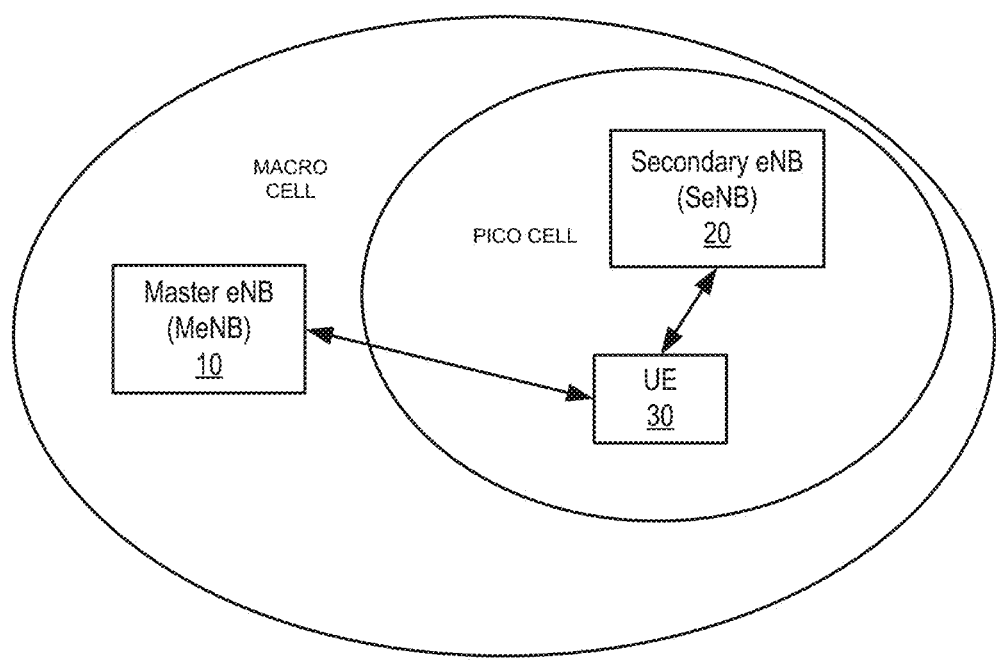
FIG. 3 is a schematic block diagram illustrating a UE utilizing dual connectivity in a pico cell within a macro cell according to embodiments of the inventive concepts.

Dual connectivity is a feature defined from the UE perspective in which the UE may simultaneously receive and transmit to at least two different network points. Dual connectivity is one of the features that are being standardized within the umbrella work of small cell enhancements within 3GPP Rel-12. A UE using dual connectivity maintains simultaneous connections to a Master eNB (MeNB) and a Secondary eNB (SeNB) node, as shown in FIG. 3. As shown therein, a UE 30 that is within the coverage of both a macro cell served by a Master eNB 10 and a pico cell served by a Secondary eNB 20 may communicate simultaneously with both the MeNB and the SeNB, thereby potentially increasing the communication bandwidth available to the UE 30 for uplink and/or downlink communications. Note that Dual Connectivity may also operate if the SeNB is a macro base station, or the MeNB is a pico base station, etc.

As the name indicates, the Master eNB provides the control plane connection for the UE and is thus the controlling node of the UE. In addition to the MeNB, the UE may be connected to one or several SeNBs for added user plane support. The MeNB and SeNB roles are defined from a UE point of view. This means that an eNB that acts as an MeNB to one UE may act as SeNB to another UE.

X2-Based Handovers Involving HeNBs

X2-based Handover involving HeNBs is allowed as shown in Table 4.6.1-1 of 3GPP Technical Specification 36.300, reproduced below.

TABLE 4.6.1-1

| X2-based HO support | | |
|---|---|---|
| Source | Target | Notes |
| eNB or any HeNB | open access HeNB | |
| eNB, or any HeNB | hybrid access HeNB | |
| hybrid access HeNB or closed access HeNB | closed access HeNB | Only applies for same CSG ID and PLMN, and if the UE is a member of the CSG cell. |
| Any HeNB | eNB | |

3GPP Rel-12 supports X2-connectivity between HeNBs, independent of whether any of the involved HeNBs is connected to a HeNB gateway.

In the current procedure for Dual Connectivity defined in LTE Release 12, there is not any procedure defined for support of Secondary Cell Groups when the involved (H)eNB is in closed access or Hybrid access mode. In this scenario, CSG membership status needs to be verified by the core network (CN), which holds reliable and up-to-date information about the membership status of the UE. For example, in the case of LTE, CSG membership verification is performed by the Mobility Management Entity (MME). A new procedure for CSG membership verification over a RAN-CN interface, such as an S1 application protocol (S1AP) procedure, and new exchange of CSG Membership status and CSG ID Information Elements is needed.

The present inventive concepts relate to dual connectivity. In particular, the present inventive concepts address the situation when a cell to be added to a Secondary Cell Group is a CSG cell having a Closed or Hybrid access type. The setup of radio resources for a UE at the Secondary eNB (SeNB) is performed by a Master eNB (MeNB) by means of X2AP and RRC signaling. If the cell to be added to the Secondary Cell Group is a CSG cell in Hybrid Access mode, a problem may exist of verifying the CSG membership status with the MME by means of S1AP signaling after the hybrid CSG cell has been added to the Secondary Cell Group. For a closed cell, the problem is to verify CSG membership status before the closed CSG cell has been added to the SCG. The present inventive concepts provide systems/methods that perform membership verification with the MME for closed and hybrid CSG cells to be added to a Secondary Cell Group for dual connectivity.

In the embodiments described herein, the concept of a Closed Subscriber Group (i.e. hybrid or closed access) is intended to be applicable to all type of base stations, including for example eNBs, Home eNBs, relay nodes, etc. The embodiments described herein specifically relate to the scenario of CSGs applied to HeNBs. However, the systems methods described herein are not limited to HeNBs, and it should be understood that the systems/methods apply to any type of node that can support CSGs. Likewise, the embodiments described herein focus on the example technology of LTE but they can be applied to any technology where concepts similar to dual connectivity and CSG are supported.

Some embodiments described herein provide a mechanism to verify the CSG membership status of a UE when the Secondary eNB (SeNB) selected for use in Dual Connectivity support to the UE is a (H)eNB in Closed or Hybrid access mode. In particular embodiments, CSG membership status of a UE may be verified by the MME function in an LTE network. Verification of the CSG membership status of the UE is transmitted to the Master eNB when the Secondary eNB supports Closed Subscriber Groups in Dual Connectivity.

Some embodiments provide systems/methods for verifying the CSG Membership Status of a UE using Dual Connectivity when a cell to be added to a Secondary Cell Group is a CSG cell. These systems methods may also help ensure that Dual Connectivity is working for CSG.

Some embodiments address a situation when a cell to be added to a Secondary Cell Group is a CSG cell and the involved eNB is an HeNB in Closed or Hybrid access mode. If the cell to be added to the Secondary Cell Group is an HeNB in Hybrid Access mode, CSG membership may be verified with the MME by means of S1AP signaling after the hybrid CSG cell has been added to the SCG. If the cell is an HeNB cell in Closed Access mode, CSG membership may be verified before the closed CSG cell has been added to the Secondary Cell Group. The embodiments described herein provide systems methods that perform CSG membership verification with the MME function when closed and hybrid CSG cells are to be added to the SCG during mobility.

Mobility Signaling for CSG UEs in Dual Connectivity

As used herein, "open cells" refers to cells (or their eNBs) that have no access restrictions/rules for being connected to CSGs. Such cells are defined in LTE Rel-12 as capable of acting as targets for Dual Connectivity (i.e., for being added to a Secondary Cell Group). In contrast, embodiments described herein enable hybrid CSG cells and closed CSG cells to be added to a Secondary Cell Group so that they can act as targets for Dual Connectivity.

For hybrid CSG cells, it is possible to admit resources for a UE before the CSG membership status of the UE (which is declared by the UE via RRC signaling) has been verified by the MME. The membership verification for the UE can be performed after resource admission by the SeNB serving the hybrid access cell.

This is possible because in scenarios where the target is a hybrid cell (or, in case of Dual Connectivity, where the SCG is a hybrid cell), resource admission can be performed immediately and would not need to wait for the result of the membership verification process. The latter is due to the fact that all UEs can be admitted into hybrid cell, even those that are not members of the CSG associated with the hybrid cell. The only issue is whether UEs being admitted in the hybrid cell should be prioritized with respect to other UEs in the cell. This issue can be resolved by making a first assumption (that would hold until membership verification is checked) that either the UE declared Membership Status is considered to be valid (i.e. the UE is considered member of the CSG) or that the UE is considered a non-member of the CSG. For Dual Connectivity scenarios, this means that if membership needs to be verified with the MME for Hybrid Access Secondary Cell Groups, this should happen only after Secondary Cell Group related reconfiguration has taken place. Depending on the result of the membership verification, the SeNB can take further actions. For example, if the membership verification reveals that the UE is a non-member, the SeNB may decide to reject the UE, or if the membership verification reveals that the UE is a member, the SeNB may decide to serve the UE with a better QoS.

In case the UE has been admitted with SeNB resources from a hybrid cell and moves towards another hybrid cell, which has the same CSG ID as the first one, the MeNB may be able to re-use the result of the membership verification performed for the first Secondary Cell Group and therefore avoid having to perform a further membership verification with the Core Network. Namely, the UE would be treated in a second Secondary Cell Group with same CSG ID as the first Secondary Cell Group according to the membership status verified when admission to the first hybrid access Secondary Cell Group was performed.

For addition of closed access Secondary Cell Groups, membership verification with the MME has to be performed before resources for a UE are admitted by the SeNB.

Similar to the case described above, when a second closed access SCG with the same CSG ID of a first already added closed access SCG needs to be added for a UE, the MeNB may avoid having to perform a second membership verification with the Core Network, and may add the SCG according to the membership status verified when admission to the first closed access SCG was performed.

If the CSG membership status of a UE changes after the MeNB has verified it, the Core Network may notify the MeNB of such change. For example, this could happen via S1AP UE Context Modification procedures, where the MME can send an updated CSG Membership Status to the MeNB for a specific UE.

Figure 4:
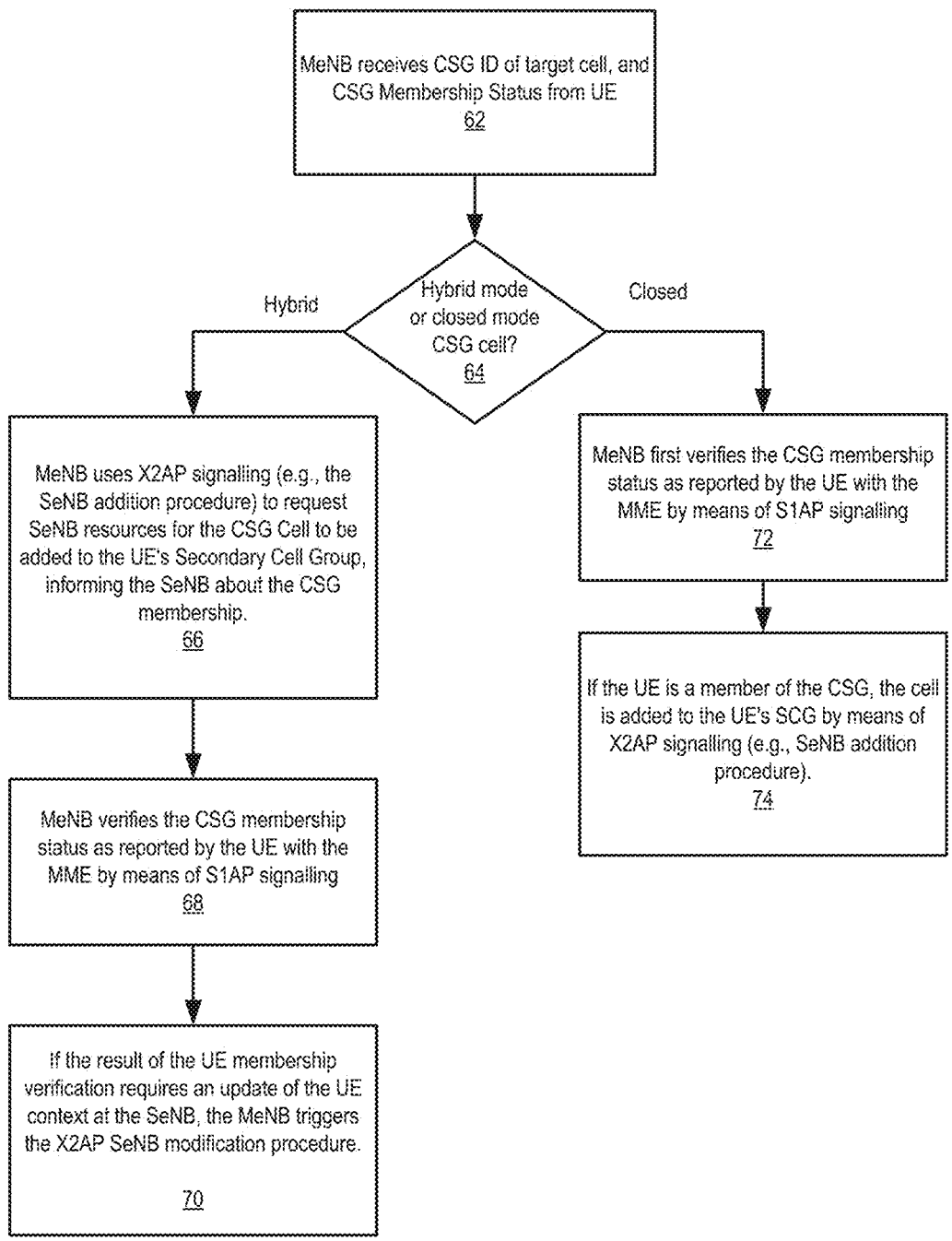
FIGS. 4-8 are flow charts illustrating operations and message flows according to embodiments of the inventive concepts.

Operations according to some embodiments are illustrated in FIG. 4, which is a flowchart of operations that may be performed by systems and/or methods according to various embodiments of the inventive concepts.

Referring to FIGS. 3 and 4, after a UE 30 that is connected to an MeNB 10 detects a potential candidate, or target, cell (in the SeNB 20) for Dual Connectivity by means of the target cell's Physical Cell Identifier, the UE 30 receives the target cell's CSG ID, and reports the CSG ID and the UE's Membership Status relative to the detected CSG ID to the MeNB 10.

In block 62, the MeNB receives the CSG ID and the UE's Membership status from the UE.

In block 64, the MeNB determines if the target cell (in the SeNB 20) is a CSG cell operating in Closed access mode or Hybrid access mode. If the MeNB determines that the target cell (in SeNB 20) is a CSG cell operating in Hybrid access mode, operations proceed to block 66. Otherwise, if the MeNB determines that the target cell (in SeNB 20) is a CSG cell operating in Closed access mode, operations proceed to block 72.

Referring to block 66, if the MeNB 10 determines that the cell is a CSG cell operating in Hybrid access mode, then the MeNB 10 uses the X2AP signaling protocol to request SeNB resources for the CSG cell to be added to the UE's Secondary Cell Group, which informs the SeNB 20 about the membership of the UE 30 in the CSG. At this stage, for hybrid mode CSG cells, the SeNB may trust the membership status provided by the UE.

In block 68, the MeNB 10 verifies the CSG membership status as reported by the UE 30 with the MME by means of S1AP signaling.

In block 70, if the result of the UE membership verification requires an update of the UE context at the SeNB, the MeNB triggers the X2AP SeNB Modification Procedure. If the membership verification fails (e.g. if the UE 30 falsely or incorrectly claimed to be a member of the CSG), it is up to the SeNB 20 to determine what action to take. For example, the UE 30 could be rejected or simply treated as a non-member.

Referring to block 72, if the MeNB 10 determines that the SeNB 20 is a CSG cell operating in Closed access mode, the MeNB 10 first verifies the CSG membership status as reported by the UE with the MME by means of S1AP signaling.

Referring to block 74, if the UE is a member of the CSG associated with the SeNB 20, the cell is added to the UE's Secondary Cell Group by means of X2AP signaling (e.g., by the SeNB Addition procedure). If the membership verification fails (e.g. if the UE 30 falsely or incorrectly claimed to be a member of the CSG), the MeNB 10 may not add the SeNB 20 to the UE's Secondary Cell Group.

Figure 5:
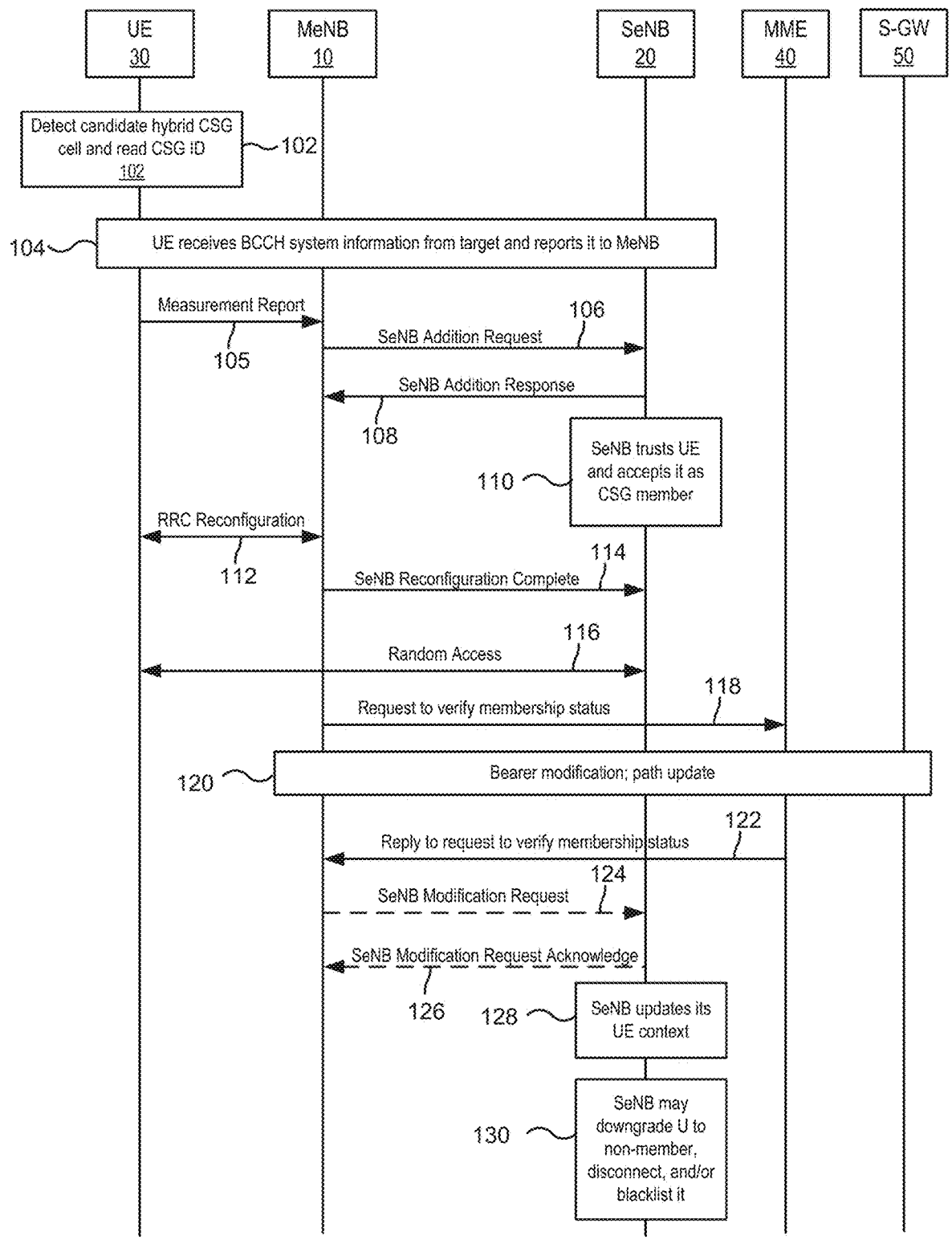

Message flows and operations according to some embodiments in which the target SeNB is a Hybrid access CSG node are illustrated in FIG. 5. Referring to FIG. 5, in block 102, a UE 30 that is connected to an MeNB 10 detects a potential candidate, or target, cell (SeNB 20) for Dual Connectivity by means of the target cell's Physical Cell Identifier.

In block 104, the UE 30 receives BCCH system information from the target SeNB 20, reads System Information Blocks from the system information including the target cell's CSG ID, and reports the CSG ID and the UE's Membership Status relative to the detected CSG ID to the MeNB 10.

In message 105, the MeNB 10 receives CSG-related information from the UE 30 (e.g., CSG Membership Status, CSG-ID) in a Measurement Report.

In messages 106 and 108, the MeNB 10 performs an SeNB Addition procedure by sending an SeNB Addition request 106 including a new CSG Membership Status Information Element (IE) to the SeNB 20.

In block 110, the SeNB 20 trusts the UE 30 and accepts it as a CSG member. The MeNB 10 then performs RRC reconfiguration 112 of the UE 30 to enable it to communicate with the SeNB 20. When RRC reconfiguration is complete, the MeNB 10 informs the SeNB 20 (message 114), allowing the UE 30 to access the SeNB 20 (message 116).

In message 118, the MeNB 10 requests the MME 40 to verify the membership status of the UE 30 for the CSG-ID reported by the UE30, if the respective result is not yet available at the MeNB (e.g. from a previous SeNB Addition).

For SCG Bearer, the MAP E-RAB Modification Indication procedure 120 can be used. The new CSG Membership Status and CSG ID may be added on an E-RAB Modification Indication Procedure. For a Split Bearer, a new Class 1 procedure may be defined (e.g. Membership Verify). The CSG Membership Status and CSG ID declared by the UE are included. The MME 40 verifies the membership status of the UE and replies to the MeNB with the result (message 122).

In a different embodiment for Split Bearer, the new procedure to request membership verification to the MME 40 (e.g. Membership Verify) is defined as Class 2 (i.e. no response message is defined). In this case, the MME 40 may trigger the existing UE Context Modification procedure following the new Class 2 procedure, including the verified CSG membership status in the message to the MeNB 10.

If the membership verification requires an update of the UE context at the SeNB 20 (e.g., from member to non-member due to an indication by the MME 40 that the UE 30 is not a member of the identified CSG), the MeNB 10 triggers an SeNB Modification procedure including a new IE (CSG Membership Status) in a SeNB Modification Request (message 124), which is acknowledged by the SeNB (message 126). The SeNB updates its UE context in response to the modification request (block 128). If the membership verification by the MME 40 fails, then in block 130 it is up to the SeNB 20 to decide on what further action to take (e.g. downgrade the UE as a non-member, drop the connection and/or blacklist the UE temporarily or permanently).

Any time the CSG Membership Status of the UE 30 changes after a membership verification has been performed with the MME 40, the MME 40 may trigger an S1AP procedure to update the CSG Membership Status accordingly. This procedure may be the UE Context Modification procedure or another procedure. If the newly signaled CSG Membership Status requires notification from the MeNB 10 to the SeNB 20, messages 13 and 14 may be exchanged again.

Figure 6:
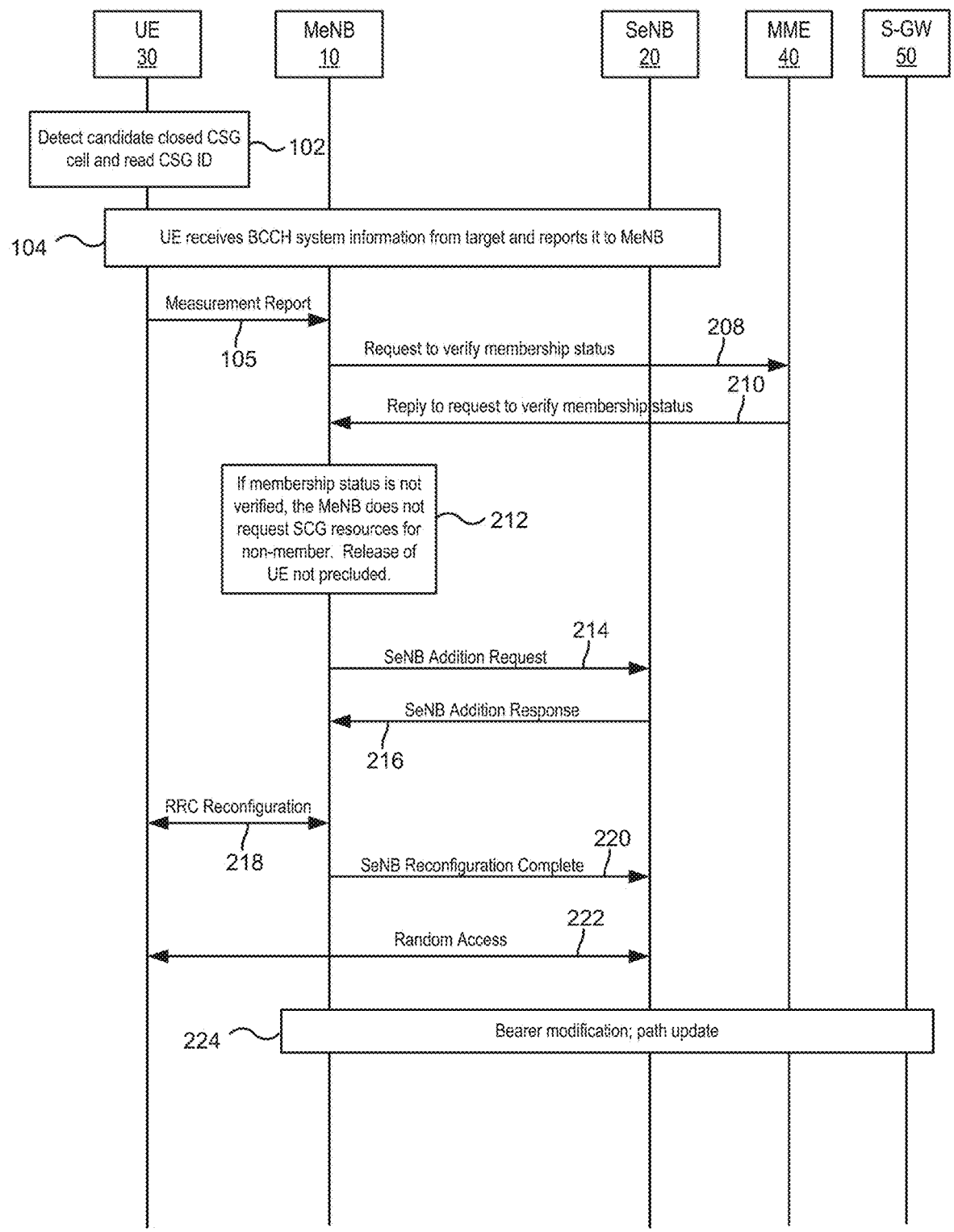

Message flows and operations according to some embodiments in which the target SeNB is a Closed access CSG node are illustrated in FIG. 6. In the embodiments of FIG. 6, blocks/messages 102-105 are the same as those shown in FIG. 5. However, because in the example of FIG. 6 the SeNB 20 is in Closed access mode, the MeNB 10 immediately sends a request in messages 208, 210 to the MME 40 using the S1AP protocol to verify the membership status of the UE 30 in the CSG associated with the SeNB 20.

A new Class 1 procedure (e.g. Membership Verify) may be used for message 208 from the MeNB 10 to the MME 40. The CSG Membership Status and CSG ID declared by the UE 30 are included in the Membership Verify procedure. The MME 40 verifies the membership status of the UE 30 and replies to the MeNB 10 with the result (message 210).

In other embodiments, the new procedure to request membership verification to the MME 40 (e.g. Membership Verify) may be defined as Class 2 (i.e. no response message is defined). In this case, the MME 40 may trigger the existing UE Context Modification procedure following the new Class 2 procedure, including the verified CSG membership status in the message to the MeNB.

In block 212, if the membership verification fails, the MeNB 10 does not request SCG resources to the target cell. The MeNB 10 may then release the UE, according to implementation, and the procedure stops.

If, on the other and, the UE CSG membership is confirmed, the MeNB 10 in messages 214-216 performs an SeNB Addition procedure. The New IE:CSG Membership Status is added on the SeNB Addition Request message 214 from the MeNB 10 to the SeNB 20, and the procedure ends.

If the CSG Membership Status of the UE 30 changes after a membership verification has been performed with the MME, the MME may trigger an S1AP procedure to update the CSG Membership Status accordingly. This procedure could be the UE Context Modification procedure or a different (new) procedure. If the newly signaled CSG Membership Status requires notification from the MeNB 10 to the SeNB 20, messages 214 and 216 may be exchanged again.

Figure 7:
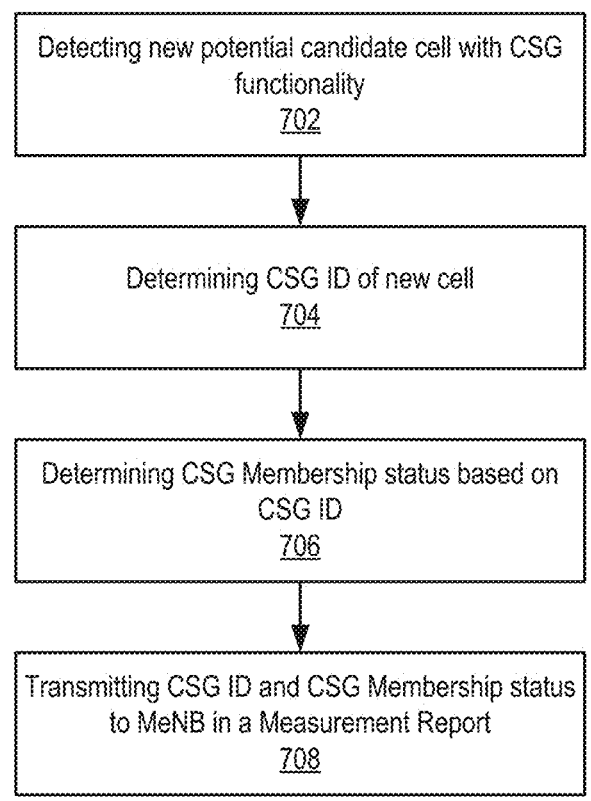

Operations of a user equipment node 30 in accordance with some embodiments of the inventive concepts are illustrated in FIG. 7. Referring to FIGS. 3 and 7, a UE 30 detects a new potential candidate cell with CSG functionality (block 702). The UE 30 determines the CSG ID of the new cell (block 704), and determines its membership status relative to the CSG ID of the new cell (block 706). The UE 30 then transmits a Measurement Report to its MeNB 10 including the CSG ID of the new cell and the CSG Membership status of the UE with respect to the new cell (block 708). If the UE is authorized to add the new cell as a secondary cell, the MeNB 10 will then perform RRC reconfiguration to allow the UE 30 to use the SeNB 20 for dual connectivity.

Figure 8:
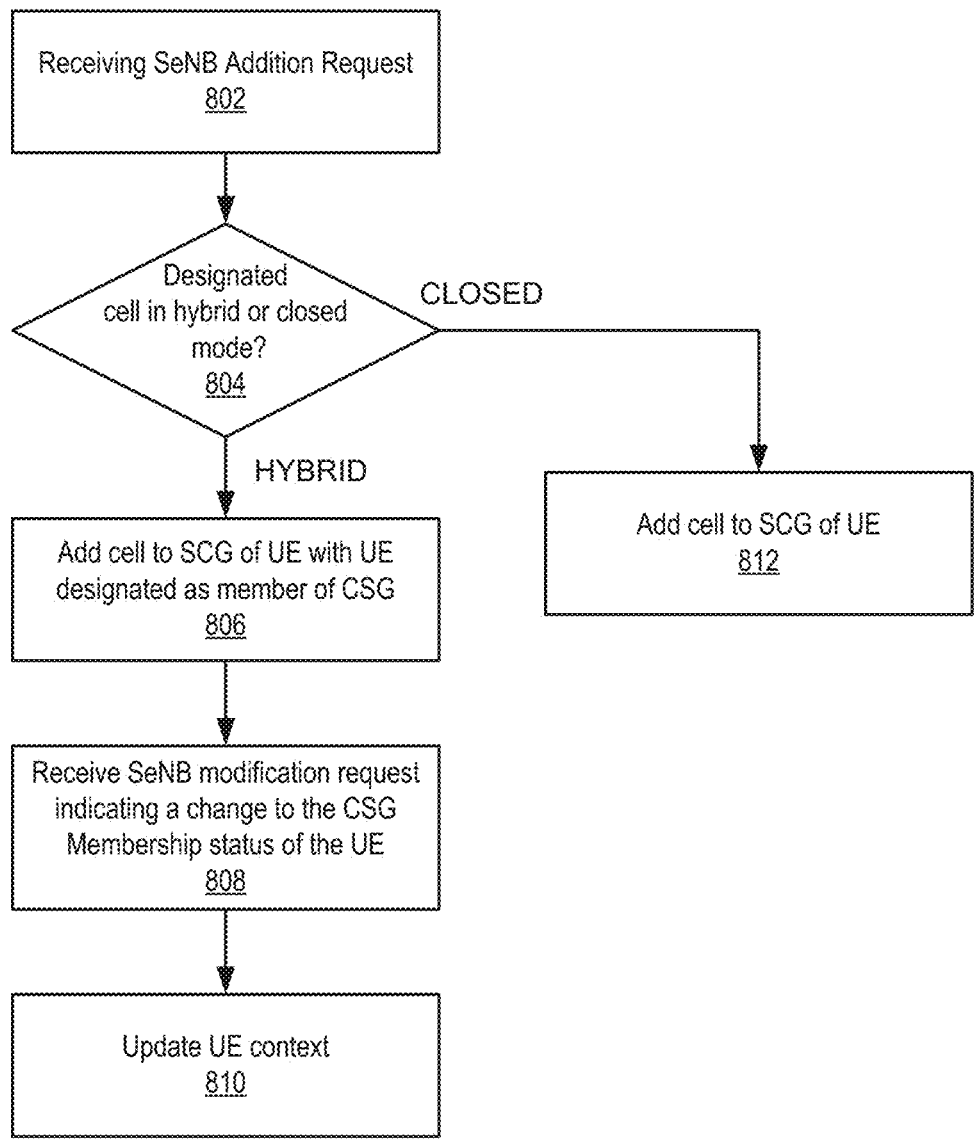

Operations of an SeNB 20 in accordance with some embodiments of the inventive concepts are illustrated in FIG. 8. Referring to FIGS. 3 and 8, an SeNB 20 receives an SeNB addition request from an MeNB 10 identifying the UE and identifying a target cell by its CSG ID (block 802). The SeNB determines if the identified cell is operating in hybrid or closed mode (block 804). If the cell is operating in hybrid mode, the SeNB 20 adds the cell to the Secondary Cell Group of the UE with the UE designated as a member of the Closed Subscriber Group associated with the cell (block 806). The SeNB 20 may then receive an SeNB modification request indicating a change to the CSG membership status of the UE (block 808). The SeNB 20 then updates the context of the UE 30 based on the SeNB modification request (block 810). For example, if the SeNB modification request indicates that the UE is not a member of the CSG associated with the cell, the SeNB can downgrade the status of the UE to nonmember status, reject the UE from the cell, or take any other suitable action.

If in block 804 the SeNB determines that the identified cell is operating in closed mode, the cell is added to the SCG of the UE (block 812), as it is assumed that the MeNB has already verified the CSG membership of the UE.

Example Network Node and User Equipment Node

Figure 9:
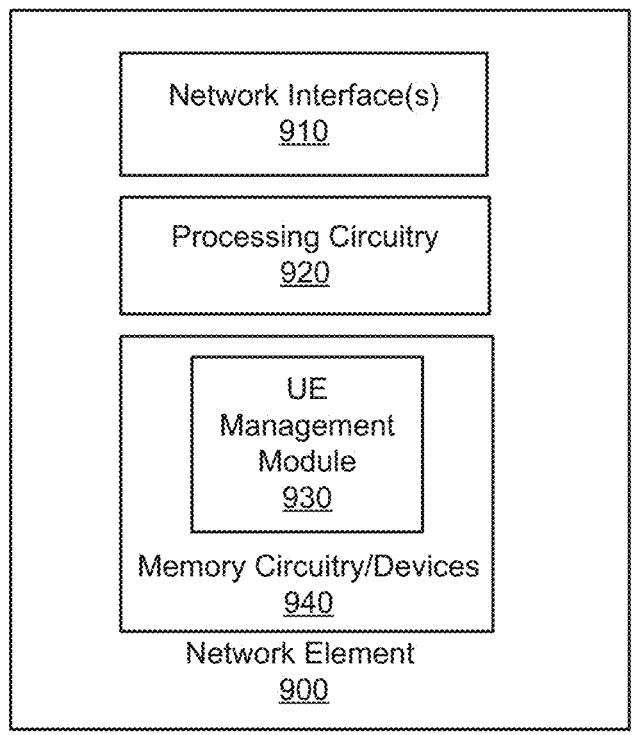
FIG. 9 is a block diagram of a network element according to embodiments of the inventive concepts.

FIG. 9 illustrates a block diagram of a network element 900 that is configured in accordance with some embodiments of the present invention. The network element 900 may correspond to the MeNB 10 and may be configured to carry-out at least some of the respective functionality described herein. It will be appreciated, however, that some of the functionality illustrated as being performed in the MeNB 10 maybe performed instead in one or more other network elements, such as an HeNB or an HeNB gateway.

Referring to FIG. 9, the network element 900 can include one or more network interfaces 910, processing circuitry 920, and memory circuitry/devices 940 that contain functional modules 960.

The processing circuitry 920 may include one or more data processing circuits, such as a general purpose and/or special purpose processor (e.g., microprocessor and/or digital signal processor). The processing circuitry 920 is configured to execute computer program instructions from the functional modules in the memory circuitry/devices 940, described below as a computer readable medium, to perform some or all of the operations and methods that are described above for one or more of the embodiments. The functional modules may include, for example, a UE management module 930 that configures the processing circuitry 920 to carry out the operations of the MeNB 10 illustrated in FIGS. 4-6.

Accordingly, the processing circuitry 920 can be configured by execution of the computer program instructions in the UE management module 930 to carry out at least some of the functionality described herein to set up Dual Connectivity connections between a UE and an SeNB cell that is operating in Closed or Hybrid access mode.

For example, referring to FIG. 4, the UE management module 930 may configure the processing circuitry 920 to perform operations such as receiving the target cell's CSG ID and the UE's Membership Status relative to the detected CSG ID from the UE (block 62) to the MeNB 10, and determining in block 64 if the target cell is operating in Closed access mode or Hybrid access mode.

The UE management module 930 may further configure the processing circuitry 920 to use the X2AP signaling protocol to request SeNB resources for the CSG cell to be added to the UE's Secondary Cell Group if the target cell is in hybrid mode (block 66).

The UE management module 930 may further configure the processing circuitry 920 to then verify the CSG membership status as reported by the UE 30 with the MME by means of S1AP signaling (block 68), and, if the result of the UE membership verification requires an update of the UE context at the SeNB, to initiate an X2AP SeNB Modification Procedure (block 90).

If the MeNB 10 determines that the SeNB 20 is a CSG cell operating in Closed access mode, the UE management module 930 may further configure the processing circuitry 920 to verify the CSG membership status as reported by the UE with the MME by means of S1AP signaling (block 92), and then to add the cell to the UE's Secondary Cell Group by means of X2AP signaling if the verification succeeds (block 94) or not add the cell to the UE's Secondary Cell Group if the verification fails.

In some embodiments, the network node 900 may implement an SeNB 20 as illustrated in FIGS. 3, 5 and 6. For example, referring to FIG. 8, the UE management module 930 of the network node 900 may configure the processing circuitry 920 to perform operations such as receiving an SeNB addition requests (block 802), determining the operation mode of the designated cell (block 804), adding the cell to the SCG of the UE (blocks 806, 812), receiving SeNB modification requests (block 808) and updating the UE context in response to an SeNB modification request (block 810).

Figure 10:
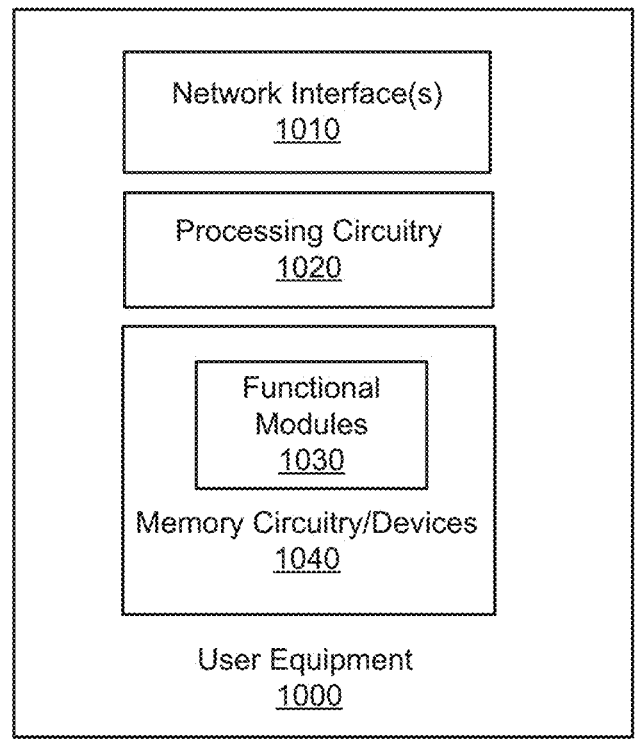
FIG. 10 is a block diagram of a user equipment according to embodiments of the inventive concepts.

FIG. 10 illustrates a block diagram of a user equipment node 1000 that is configured in accordance with some embodiments of the present invention. The user equipment node 1000 may correspond to the UE 30 illustrated in FIGS. 3, 5 and 6, and may be configured to carry-out at least some of the respective functionality described herein.

Referring to FIG. 10, the user equipment node 1000 can include one or more network interfaces 1010, processing circuitry 1020, and memory circuitry/devices 1040 that contain functional modules 1060.

The processing circuitry 1020 may include one or more data processing circuits, such as a general purpose and/or special purpose processor (e.g., microprocessor and/or digital signal processor). The processing circuitry 1020 is configured to execute computer program instructions from the functional modules in the memory circuitry/devices 1040, described below as a computer readable medium, to perform some or all of the operations and methods that are described above for one or more of the embodiments. The functional modules may include, for example, a functional module 1030 that configures the processing circuitry 1020 to carry out the operations of the UE 30 illustrated in FIGS. 5-7.

Accordingly, the processing circuitry 1020 can be configured by execution of the computer program instructions in the functional module 1030 to carry out at least some of the functionality described herein to set up Dual Connectivity connections between with an SeNB cell that is operating in Closed or Hybrid access mode.

For example, referring to FIG. 7, the functional module 1030 may configure the processing circuitry 1020 to perform operations such as detecting a new potential candidate cell with CSG functionality (block 702), determining the CSG ID of the cell and the CSG Membership status of the UE relative to the CSG ID (blocks 704-706) and transmitting the CSG ID and CSG Membership status to the MeNB (block 708).

LIST OF ACRONYMS AND ABBREVIATIONS

3GPP 3rd Generation Partnership Project
CSG Closed Subscriber Group
E-UTRAN Evolved UMTS Terrestrial Radio Access Network
eNB/eNodeB enhanced Node B (base station)
HeNB Home eNB
IE Information Element
LTE Long Term Evolution
MME Mobility Management Entity
MeNB Master eNB
SeNB Secondary eNB
SCG Secondary Cell Group
UE User Equipment
RRC Radio Resource Control
QoS Quality of Service
S1AP S1 Application protocol
X2AP X2 Application protocol
CN Core Network
RAN Radio Access Network
S-GW Serving Gateway Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes". "have". "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

The invention claimed is:

1. A method, comprising:
receiving, at a network node, a Closed Subscriber Group, CSG, identifier, ID, associated with a Secondary eNodeB, SeNB, cell that is proposed to be added to a Secondary Cell Group of a user equipment node and a CSG Membership status of the user equipment node relative to the CSG ID;
determining if the SeNB cell is operating in a closed or hybrid access mode;
adding the SeNB cell to the Secondary Cell Group of the user equipment node in response to determining that the SeNB is operating in the hybrid access mode; and
thereafter, verifying the CSG Membership status of the user equipment node relative to the CSG ID.

2. A method according to claim 1, further comprising, if verification of the CSG Membership status of the user equipment node relative to the CSG ID reveals an actual CSG Membership Status different from the one previously received, informing the SeNB of the actual CSG Membership status of the user equipment node.

3. A method according to claim 2, further comprising:
initiating an X2 Application Protocol, X2AP, SeNB modification procedure in response to failure of verification of the CSG Membership status of the user equipment node relative to the CSG ID.

4. A method according to claim 1, further comprising:
sending an SeNB addition request to the SeNB in response to determining that the SeNB cell is operating in hybrid access mode.

5. A method according to claim 4, wherein the SeNB addition request comprises a CSG Membership Status Information Element.

6. A method according to claim 1, further comprising:
verifying the CSG Membership status of the user equipment node relative to the CSG ID in response to determining that the SeNB cell is operating in the closed access mode.

7. A method according to claim 6, further comprising:
performing an SeNB addition procedure to add the cell to the UE's secondary cell group.

8. A method according to claim 1, further comprising performing radio resource control, RRC, reconfiguration to enable dual connectivity between the user equipment node and the SeNB before verifying the CSG Membership status of the user equipment node.

9. A method according claim 1, wherein verifying the CSG Membership status of the user equipment node comprises sending a request to a mobility management entity over an S1AP protocol interface.

10. A method according claim 1, wherein the CSG ID and the CSG Membership status of the user equipment node relative to the CSG ID are received in a measurement report.

11. A method according to claim 1, further comprising:
receiving a context modification request from a mobility management entity indicating a change in CSG Membership status of the user equipment node, and notifying the SeNB of the change in CSG Membership status of the user equipment node.

12. A method according to claim 1, wherein the steps of receiving the identification of the cell in a SeNB cell that is proposed to be added to a Secondary Cell Group of a user equipment node, the CSG ID associated with the SeNB cell and the CSG Membership status of the user equipment node relative to the CSG ID, determining if the SeNB cell is operating in a closed or hybrid access mode, adding the SeNB cell to the Secondary Cell Group of the user equipment node in response to determining that the SeNB is operating in the hybrid access mode, and verifying the CSG Membership status of the user equipment node relative to the CSG ID are performed by a processing circuitry.

13. A network node, comprising:
a processor circuit;
a network interface coupled to the processor; and
a memory device coupled to the processor;
wherein the memory device comprises a user equipment, UE, management module that configures the processor circuit to receive a Closed Subscriber Group, CSG, identifier, ID, associated with a Secondary eNodeB, SeNB cell, that is proposed to be added to a Secondary Cell Group of a user equipment node and a CSG Membership status of the user equipment node relative to the CSG ID, determine if the SeNB cell is operating in a closed or hybrid access mode, add the SeNB cell to the Secondary Cell Group of the user equipment node in response to determining that the SeNB is operating in the hybrid access mode, and thereafter, verify the CSG Membership status of the user equipment node relative to the CSG ID.

14. The network node of claim 13, wherein the UE management module further configures the processor circuit to inform the SeNB of the actual CSG Membership status of the user equipment node if verification of the CSG Membership status of the user equipment node relative to the CSG ID reveals an actual CSG Membership Status different from the one previously received.

* * * * *